United States Patent [19]

Pritchard

[11] Patent Number: 4,861,561

[45] Date of Patent: Aug. 29, 1989

[54] HIGH SPEED EXTRACTION AND TREATMENT APPARATUS

[75] Inventor: F. D. Pritchard, Clarksville, Va.

[73] Assignee: Burlington Industries, Inc., Greensboro, N.C.

[21] Appl. No.: 802,464

[22] Filed: Nov. 27, 1985

[51] Int. Cl.⁴ .............................................. B01D 11/00
[52] U.S. Cl. .................................... 422/116; 422/101; 422/280
[58] Field of Search ..................................... 422/62-65, 422/67, 101, 110, 111, 116, 280

[56] References Cited

U.S. PATENT DOCUMENTS

| | | |
|---|---|---|
| 1,314,236 | 8/1919 | Arnold . |
| 3,089,643 | 5/1963 | Idzerda et al. . |
| 3,154,670 | 10/1964 | Gossel . |
| 3,410,793 | 11/1968 | Stranahan et al. . |
| 3,798,133 | 3/1974 | Randall . |
| 3,881,872 | 5/1975 | Naono .................... 422/81 |
| 3,915,808 | 10/1975 | Wilcox . |
| 4,219,530 | 8/1980 | Kopp et al. ............ 422/101 |
| 4,265,860 | 5/1981 | Jennings et al. . |
| 4,362,699 | 12/1982 | Verlander et al. .... 422/131 |
| 4,483,823 | 11/1984 | Umetsu et al. .......... 422/63 |
| 4,483,964 | 11/1984 | Urdea et al. ............ 422/116 |
| 4,492,674 | 1/1985 | Schweighardt ........ 422/101 |
| 4,517,338 | 5/1985 | Urdeo et al. ............ 422/131 |
| 4,597,943 | 6/1986 | Sugiyama et al. ...... 422/70 |
| 4,704,256 | 11/1987 | Hood et al. .............. 422/81 |
| 4,708,886 | 11/1987 | Nelson ..................... 422/63 |

OTHER PUBLICATIONS

Fisher Scientific Co.; Fisher Scientific 83 (1983 catalog) pp. 329-332.
Polish Application entitled "A New Method For Fast Determination of Soluble Materials", by Ughetto, Lerique, and Robert, Including English Translation.
Japanese Application in English from the Japan Atomic Energy Research Institute entitled "High Pressure Soxhlet Type Leachability Testing Device and Leashing Test of Simulated High-Level Waste Glass at High Temperature", Nov. 1979.
Copy of Article in Technique of Organic Chemistry, vol. III Textbook on Extraction and Distribution, pp. 233-239.
Article from a Text-Book of Practical Organic Chemistry, pp. 152-154 and 222 and 223.

Primary Examiner—Michael S. Marcus
Attorney, Agent, or Firm—Cushman, Darby & Cushman

[57] ABSTRACT

An extraction and treatment apparatus which includes multiple solvent tanks which are switchably connected to multiple sample tubes in which material to be processed is contained. The sample tubes are filled with solvent from the tanks and drained of their processed contents, under the control of a microcomputer.

10 Claims, 5 Drawing Sheets

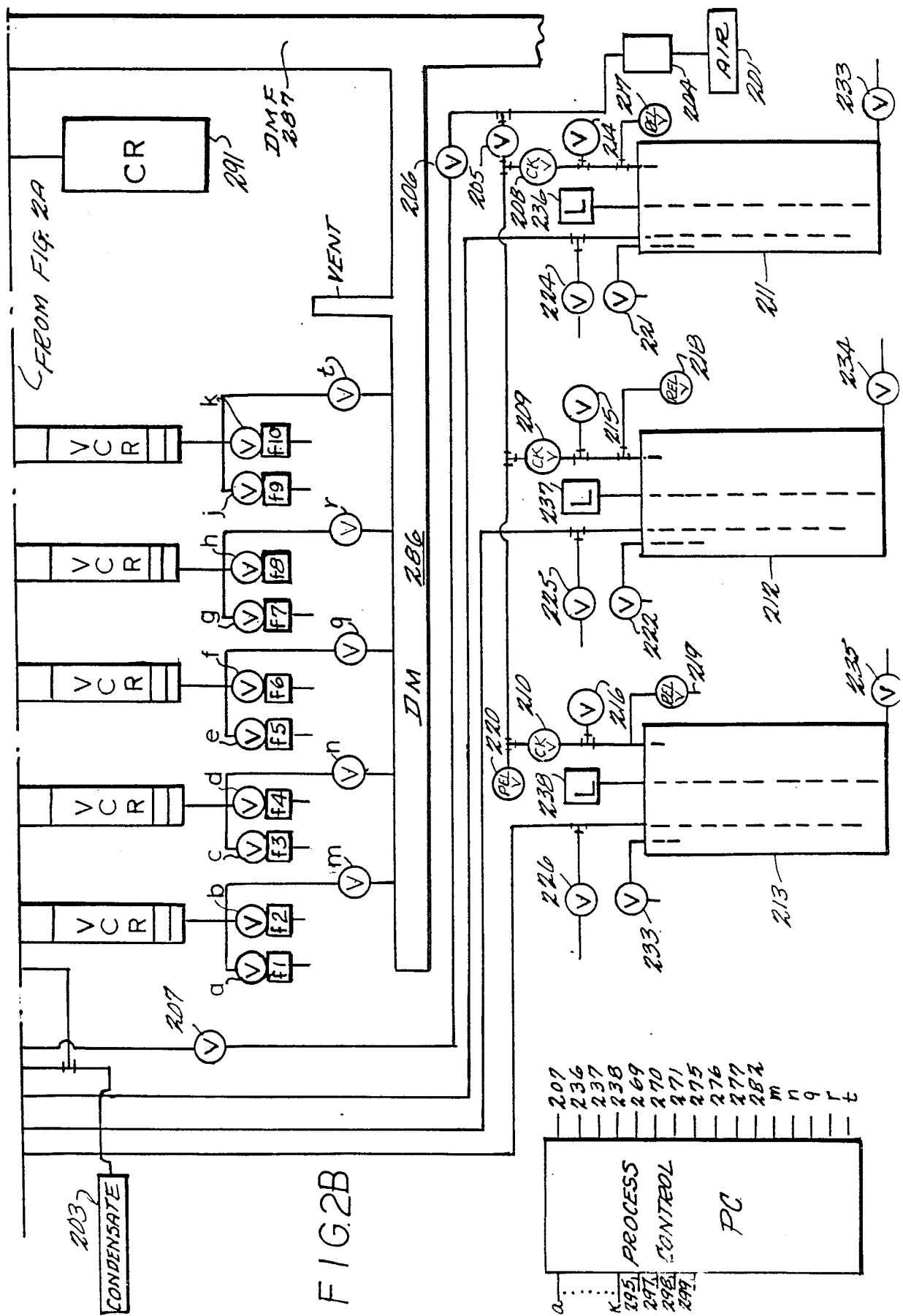

HIGH SPEED EXTRACTION AND TREATMENT APPARATUS

FIELD OF THE INVENTION

The invention relates to an extraction and treatment apparatus and more particularly to an apparatus which is applicable for high speed extraction and production runs.

BACKGROUND OF THE INVENTION

A conventional Soxhlet extraction apparatus, shown in FIG. 1, has been used in the prior art for the continuous extraction of a solid by a hot solvent. In operation, the Soxhlet extraction apparatus holds a solid substance 11 in thimble 10 which is placed within the inner tube of the apparatus. At one end, the Soxhlet apparatus is fitted to flask 12 which contains heated solvent and at its other end the apparatus is connected to reflux condenser 13. As the solvent in flask 12 is boiled, the vapor passes up through tube 14 and is condensed by condenser 13 so that the condensed solvent falls into thimble 10. When the solvent reaches the top of tube 15, it is siphoned over into flask 12 and thereby removes that portion of the substance which it has extracted in thimble 10. The process is repeated automatically until complete extraction is effected. The extracted compound may be isolated from its solution in flask 12 by a variety of known methods.

There are several advantages to the conventional Soxhlet extraction apparatus and method. First, a low total solvent volume is needed (relative to the sometimes high number of Soxhlet cycles required). Solvent conservation also occurs through the continual reuse of the solvent or solvent system, since essentially only the necessary extraction zone fill volume plus a requisite excess, to keep from running out of solvent in the distillation flask, is recycled. Second, rather precise extraction volumes and solvent-to-substrate ratios for a given extraction operation can be obtained.

However, there are many disadvantages which need to be overcome or eliminated to allow achievement of improved results and/or allow high speed extraction. A first disadvantage is the requirement that one must use an adequate excess volume of the solvent or solvent system of choice in the distillation flask as compared to merely the volume necessary to fill the extraction zone to the siphon level. The additional solvent is required in order to prevent the burning of the substrate extractables of interest, because of running out of solvent in the distillation flask while trying to fill the extraction zone. Secondly, in order to change solvent or solvent systems, the Soxhlet apparatus setup must be dismantled when the requisite number of extraction cycles are completed and the distillation flasks must be switched. This also involves replacing the flask containing the solvent or solvent system no longer needed with a flask containing the next solvent or solvent system of choice.

A further disadvantage is the need to wait to catch the extraction zone just as it is finished dumping so that the distillation flask containing the solvent or solvent system no longer needed, before redistillation of its contents begins, can be removed. A still further disadvantage is the need to turn off the distillation flask heat source and to couple this with the finish of the extraction zone solvent dumping in such a way as to prevent the initiation of solvent drip-back fires when the distillation flask is removed.

It is essential that the substrate sample be removed from the extraction zone in such a manner that the solvent or solvent system not siphoned off in the dumping step (and it is typical that this volume in many instances may reach as much as 25% of the extraction zone volume) can be transferred analytically to the distillation flask since it contains a portion of the extractables that is part of the overall extractables picture. The substrate must also be squeezed or drained in such a manner as to transfer its surface solvent or solvent system/extractables mixture in an analytical manner to the distillation flask since it contains extractables that are also part of the overall extractables picture.

Another disadvantage is the need to readjust the heat source to the proper thermal input for the new solvent or solvent system of choice once the flask containing the new solvent or solvent system of choice has been installed on the Soxhlet extractor setup. Since the time required to complete one Soxhlet extraction cycle (cycle time) is usually the result of many interacting factors such as heat source variations, room temperature variations, condensation cooling source variations, distillation properties of the solvent or solvent system of choice, sample substrate packing configuration variations, etc., it is necessary, for each Soxhlet setup, to time the cycle after distillation/extraction equilibrium is reached (which involves the heating up of the apparatus) for one "representative" cycle and then distill/extract for the required amount of time to insure completion of the required number of extraction cycles which based on experience with the particular system involved is enough to remove all of the extractables of interest.

In order to insure that the extractables of interest are removed completely, a relatively high number of Soxhlet cycles must be run in most cases, which typically may range from 10 to 20 depending upon the conditions surrounding the extractions. The process not only often removes solubles from the substrate but also insolubles in various forms such as crystals, particles, fibers, etc. If these particulate materials are not accounted for, they cloud in various ways the soluble extractables picture arrived at in gravimetric work subsequent to the Soxhlet extractions. If they are accounted for they require that separation techniques and additional gravimetric procedures be incorporated in the analytical scheme.

It would not be unusual that with certain solvent system/extraction conditions/substrate extractable combinations, that some extractables components would be extracted, siphoned off and in some instances have distillation properties that would allow them to co-distill with the solvent or solvent system of choice thereby giving potentially misleading results due to limiting recontamination, etc., of the substrate to be extracted. Since the Soxhlet extraction apparatus is open, the extractions of interest must be carried out with solvents or solvent systems which distill under relatively standard atmospheric conditions.

The solvent/substrate interface wetting (aside from chemical considerations which are of primary significance) which occurs in the extraction zone is largely the result of two additional important forces and they are atmospheric diffusion processes and channelling effects due to substrate sample packing configurations which may vary from sample to sample. The fact that the solvent movement is related significantly to gravity and diffusion effects can detrimentally enhance the effects of solvent channelling.

It would not be unusual for the filling of the extraction zone, to the siphon drain off level in a conventional Soxhlet extraction device, to take an average time which might range from approximately 20 to 60 minutes. In these cases, it is also not unusual to observe differentials in the gradient of extracted materials in the solution and/or mixture from the top to the bottom of the extraction zone. In addition to the accumulative contributions to that gradient, from the washing of extractables from the top of the sample being extracted to the bottom of the extraction zone, the gradient formation is further enhanced in that significant, real, and relatively long extraction immersion exposure time differentials exist for the sample portion at the top of the extraction zone versus that for the sample portion at the bottom of the extraction zone before siphoning off occurs. These detriments necessitate the running of a sufficiently high number of extraction cycles to insure that most of the extractables of concern are removed adequately from the entire sample in a Soxhlet extraction exposure.

The temperature at which the extraction actually occur in the extraction zone is significantly lower than the distillation temperature of the solvent or solvent system used since much heat is removed from the distilled vapors in the condensation zone. Therefore, the extraction operation is limited to the resultant condensed temperature of the solvent system used and is confined to the variations which occur in that temperature. This means that for the solvent system of choice, extractions at a higher or lower range of temperature values than the resultant limits imposed by the system of choice cannot be performed.

And finally, inherent to the use of a Soxhlet extraction system is the fact that it can only be used for extraction work. Thus, it can only be used to extract with clean solvents or solvent systems. It follows therefore that it cannot be used to expose the substrate of interest to prepared or resultant process solutions or mixtures for the purposes of altering the substrate such as dissolving all or a part of it, cleaning its surface, adding surface materials, or the thorough penetration of it to remove, add, and/or alter materials of interest.

While the above-described mode of Soxhlet extractions is of utility in analytical work, the disadvantages noted herein with the use of conventional Soxhlet extraction devices usually require long extraction times, and the results are restricted to a relatively narrow band of extraction temperatures which are related to the properties of the solvent or solvent system of choice.

SUMMARY OF THE INVENTION

The invention retains all of the benefits of conventional Soxhlet extractors, yet overcomes all of their disadvantages and limitations noted above, and provides additional use capabilities heretofore impossible with a conventional Soxhlet extraction device. More particularly, the invention, including Soxhlet characteristics, can be scaled up for pilot or production runs.

Generally, the results of the invention are achieved by changing the usual material of Soxhlet construction from glass to metal in order to operate under chemical, temperature, and pressure variations; and by eliminating, replacing, displacing, controlling, and/or reordering the functional Soxhlet constructional aspects and forcing the resultant device or apparatus via process controller or computer through its desired functional step sequencing at the desired conditions in such a manner as to achieve the desired results. More specifically, the device of the invention retains the Soxhlet extractor benefits of obtaining precise dump volumes for a given apparatus position and sample size, obtaining an extraction/treatment media-to-substrate ratio of choice and continues the use of standard Soxhlet extraction solvent media used normally at atmospheric conditions.

Significant improvements over the disadvantages and limitations noted above for conventional Soxhlet extractors are also achieved by the invention. For example, the excess volume of solvent needed for safely operating the conventional Soxhlet device is reduced from approximately 70% to approximately 4% by the present invention. The manipulation of extractor components in order to change the solvent or solvent system is eliminated by the invention since the distillation step is removed as a functional aspect of the extraction cycle, and one simply switches solvent systems by appropriate valve and conduit linkages with alternate, displaced solvent storage containers containing different solvents or solvent systems of choice, which switching is coordinated through necessary programming selection modes and operational sequencing.

The redistllation aspects of the conventional Soxhlet extractor noted above is eliminated in that the distillation step is eliminated in the invention. The potential for solvent drip-back fires is eliminated by the invention in that the dismantling of the apparatus for switching solvents or solvent systems is eliminated. Another disadvantage is eliminated in that the entire extraction zone solvent system is completely displaced by gas (any gas or gas mixtures of choice) pressure and transferred through appropriate valving and conduits to the proper receiving containers.

The need for squeezing or draining is eliminated in that these functions are replaced by a gas (any gas or gas mixture of choice) sweep or purge (at ambient temperatures or not) through the extraction zone to the receiving container, the duration of which is programmable to the extent necessary to transfer all or adequate amounts of the surface solutions or mixture to the receiving container. Still another disadvantage is eliminated since the solvent of choice and its temperature of choice (not resultant) is preset and controlled in the displaced alternate solvent storage containers so that as the selected solvent is needed it is supplied at the appropriate thermal conditions. Still another disadvantage of note is eliminated in that each cycle time becomes representative from the first to last cycle in that the duration time of a cycle is controlled by prior and appropriate programming of the extraction zone fill and dumping steps so that the time between the two becomes the precisely controllable extraction cycle time.

By eliminating the distillation and condensation steps, controlling fill and dump cycle times, and hence, duration of exposure of the substrate to the solvent, employing non-standard temperature and pressure variations, and eliminating all the disadvantages associated with switching solvents, among other improvements referred to later herein, the number of extraction cycles in order to achieve like results as would be achieved on a conventional Soxhlet extractor can be reduced. The reduction obtained is typically from twenty to two (or three) which, based on related total run time reductions of from approximately twelve hours to approximately thirty minutes, means that more samples can be extracted via the device of the present invention than by using conventional Soxhlet extractor in a given amount of time. (In some instances, thirty-five extractions have been completed in a typical day versus the normal six.)

The present invention is made so that insolubles of concern from extractions can be trapped in situ with dump line filters and in cases where dissolutions are done in the extraction zone, the insolubles can be trapped in situ by removable filters thereby eliminating the disadvantage of many additional analytical gravimetric separations. Any potential co-distillables are not recycled since the redistillation feature of the conventional Soxhlet extractor is eliminated by the invention, thereby eliminating the limiting recontamination problem, described above.

The incorporation of the facilities for working at elevated pressures (80 psig typical), allows extraction even above the boiling points of the solvent or solvent system of choice. In addition, media which is not distillable under ordinary Soxhle conditions can be used and extraction can be carried out at the temperatures of choice since forced transfer and not distillation is the mode of solvent media transfer to the extraction zone. Both of these features overcome or improve upon disadvantages which are inherent in the use capabilities of conventional Soxhlet extractors.

The capability of being able to work at pressures above one atmosphere enables forced diffusion wetting to equilibrium conditions in a very short time and at the same time optimally minimizes channelling effects in the extraction zone. Other disadvantages are overcome in that the entire extraction zone is filled to capacity in very short period of time (usually a few seconds) thereby eliminating top-to-bottom extraction zone gradients in the time of extraction immersion exposure for a given sample portion and eliminating variations in the efficiency of extractions between points in the extraction zone. Still another disadvantage is overcome in that since the solvent system of choice is displaced, its temperature can be controlled from any subambient point (as long as it remains a liquid) to any post-boiling point of practicality, which expands widely the very narrow temperature bands for extractions imposed by using conventional Soxhlet extractors.

The invention, in addition to being capable of being a substitute for a conventional Soxhlet extractor and improving upon certain features of a Soxhlet extractor by overcoming the disadvantages and limitations noted above, also yields new use capabilities impossible to achieve with a conventional Soxhlet extractor. For example, the invention allows for dissolutions of all or portions of samples in the extraction zone. Extractions with media containing non-distillables are now possible, especially aqueous solutions or mixtures of organic and/or inorganic chemicals. The invention also allows the use of resultant, altered, or prepared process solutions, emulsions, and/or mixtures in any sequencing mode of choice, at any conditions of choice on a substrate to alter all or a portion of it; clean all or a portion of it; thoroughly penetrate it to remove, add, and/or alter materials of interest; or to digest or degrade all or portions of it. While conventional Soxhlet extraction devices can be used across many disciplines such as textiles, drug extractions, dye extractions, etc., within the bounds of their limitations noted; one cannot scale up practically the Soxhlet features to a pilot or production scale. The invention allows the conventional Soxhlet features and the improved, enhanced, or added new features noted herein to be scaled up to pilot or production runs.

BRIEF DESCRIPTION OF THE DRAWINGS

FIGS. 2A and 2B shows the present invention in schematic form;

DETAILED DESCRIPTION OF THE INVENTION

Figure 1:
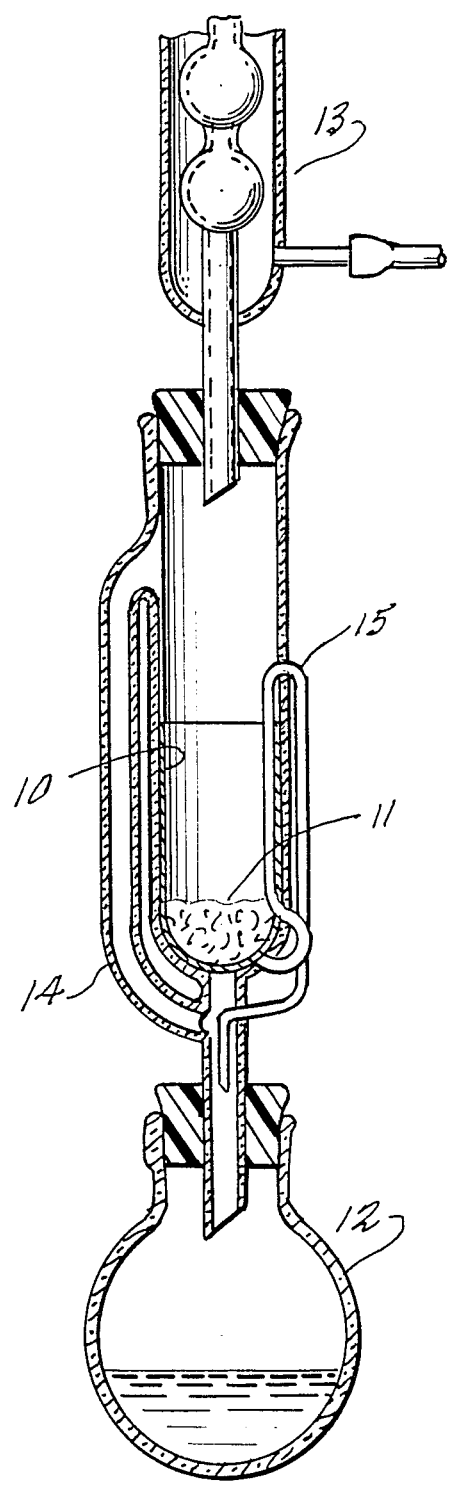
FIG. 1 shows a conventional Soxhlet extraction apparatus.
Figure 2A:
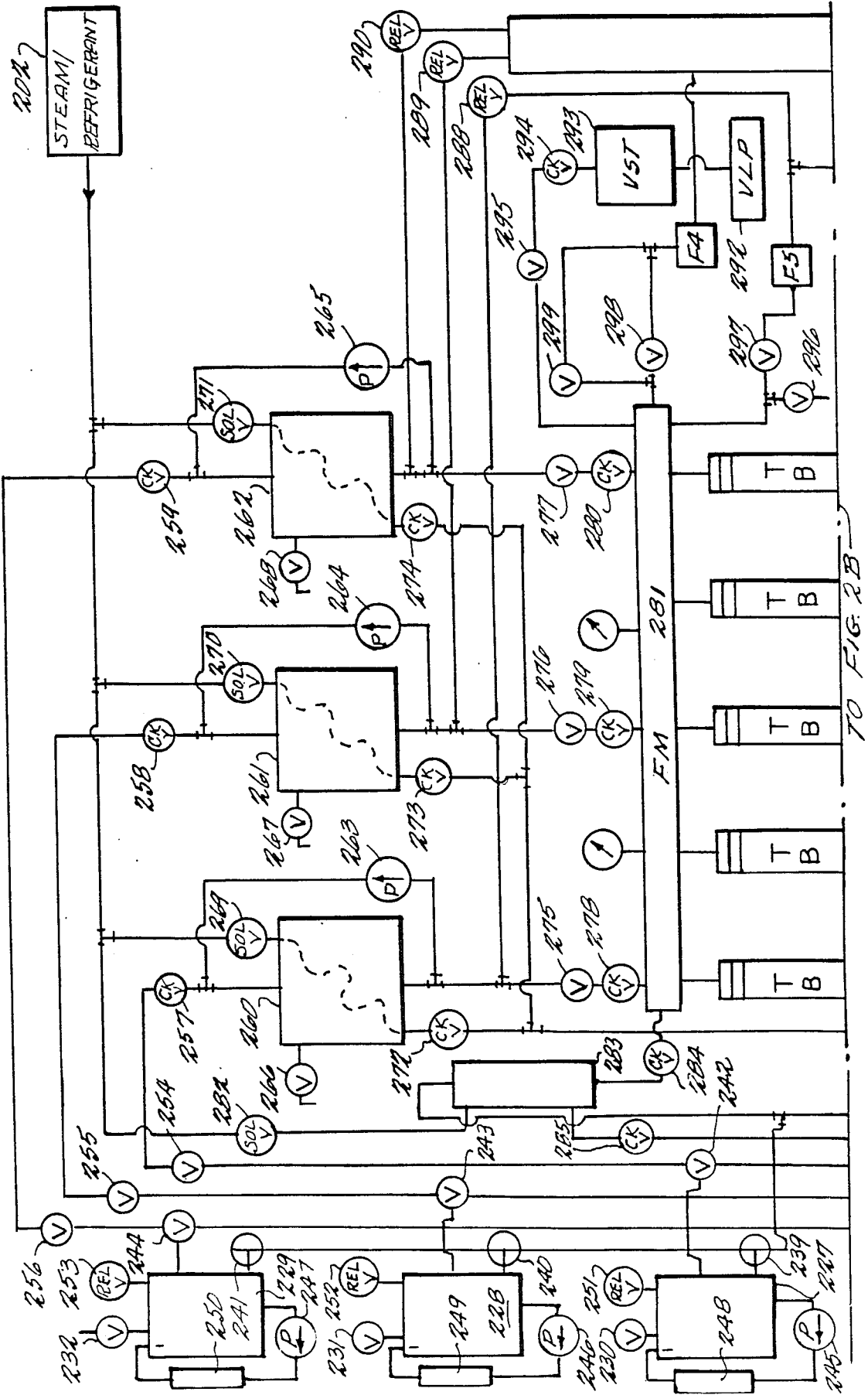

A detailed description of an exemplary embodiment of the invention will now be provided with reference to FIGS. 2A and 2B. FIGS. 2A and 2B shows an opening air or gas valving system 201, steam and/or refrigeration valving system 202 and condensation valving system 203. Air or gases pass from system 201, through filter system 204 and then to regulating systems 205 and 206. From regulating system 206, air or gases pass to valve 207 which is operated in accordance with a program loaded in a process controller or computer PC, which for example can comprise a personal computer provided by IBM, Apple, or Allen Bradley PC, etc.

From regulating system 205, air or gases pass to and through check valves 208, 209 and 210 and then to tanks 211, 212, and 213, respectively, in order to pressurize solvents and/or process liquids, altered or not, introduced to each tank through valves 214, 215 and 216, respectively. Adjustable relief valves 217, 218, 219 and 220 are provided to prevent an overpressure hazard from system gases, air, solvent or process liquids. In addition, the contents of tanks 211, 212 and 213 can be sampled by use of valves 221, 222 and 223, respectively.

The manual depressurization of each tank's contents is possible by closing valving system 201, and opening valves 224, 225 and 226 and/or in the case of the use of alternate tanks 227, 228 and 229, respective valves 230, 231 and 232. The draining and purging of tanks 211, 212 and 213 may be done through valves 233, 234 and 235, respectively.

Level indications of the contents of tanks 211, 212 and 213 are obtained via level indicators 236, 237 and 238, respectively, communicating with process controller PC. Tanks 211, 212 and 213 may be alternately supplied by opening valves 224, 225 and 226, respectively, and pressurizing the contents via air or gas valves 239, 240 and 241, of alternate tanks 227, 228 and 229, respectively, through valves 242, 243 and 244, respectively.

Alternate tanks 227, 228 and 229 contain either solvents or process fluids, altered or not, which are filled through valves 230, 231 and 232, respectively. These fluids are then circulated by pumps 245, 246 and 247, respectively, through filters 248, 249 and 250, respectively, for alteration or cleanup. These tanks are fitted with relief valves 251, 252 and 253, respectively, to prevent overpressure hazards.

In accordance with a program loaded into process controller PC, the contents of any combination and/or sequence of tanks (main or alternate) may be passed under pressure through valves 254, 255 and 256, then through check valves 257, 258 and 259, respectively, and on to thermal tanks 260, 261 and 262 wherein the solvents or process fluids may then be thermally altered up or down relative to ambient temperature if desired.

The number of tanks containing solvents or process liquids is limited only to the system's process control functions for interfacing them through appropriate valving, conduits and programming logic, all of which can be altered as needed.

The contents of thermal tanks 260, 261 and 262 are circulated via pumps 263, 264 and 265, respectively, and may be sampled at valves 266, 267 and 268, respectively. In order to thermally condition the thermal tanks, steam or refrigeration at the appropriate conditions is passed from system 202, to control valves 269, 270 and 271, which are controlled by process controller PC. The process controller manipulates the steam or coolant passages based on prior control logic in order to control the contents of the tanks at preset temperature set points. Steam from the valves are passed through coils in the respective tanks and then to check valves 272, 273 and 274, respectively, and from there through proper conduit to condensate recovery 203. The refrigeration flows in a conventional closed loop.

Solvents or fluids are passed under pressure from thermal tanks 260, 261 and 262 to automatically operated valves 275, 276 and 277. In accordance with the program loaded into programming controller PC, solvents or fluids from valves 275, 276 or 277 are passed in any sequence through check valves 278, 279 and 280 to fill the manifold (FM) 281. Any solvent or fluid, passed in any desired operative sequence through valves 275, 276, 277 and other manifolds related valving, is pressurized (adjustable to a desired level up to a maximum safe operational limit of the apparatus) by air or gases which come from valve 207, to be heated or not by steam from valve 282 flowing in a programmed sequence, at exchanger 283 and the air or gases are then subsequently passed through check valve 284 to manifold 281. The steam flows on to and through check valve 285 and to subsequent condensate recovery 203.

The pressurized fluid fills the contents of portable quick-connected sample tubes TB whereupon it acts upon the contents, to extract or treat the sample contents (limited only by tube TB size and desired liquor ratios) for a period of time which corresponds to the differential between the prior program time for filling the tubes with the desired fluids and the prior program time for expelling the solvent. After processing, the fluid or gaseous contents are passed to the dump manifold (DM) 286, via appropriate valving m, n, q, r and t or to receiving containers placed under appropriate dump valves a through k, all of which are controlled via process controller PC relative to sequencing, duration of opening, timing of sequential steps, etc. The number of cycles (fills and dumps) is programmed into the process control logic at the start of an extraction or treatment run.

Any gases, fluids or solvents passed from tubes TB to dump manifold 286 are passed through vented drains to drain manifold (DMF) 287. Any overpressure occurrences which are manifested between thermal tanks 260, 261 and 262 and manifold fill valves 275, 276 or 277 are relieved through relief valves 288, 289, 290 either to the drain manifold 287 or collector (CR) 291.

A vacuum generated by a vacuum pump, aspirator, etc., (VLP) 292 acts on vacuum surge tank (VST) 293 and check valve 294 pulling a vacuum on valve 295 which is programmed sequentially as desired by process controller PC to act in concert with other appropriate valving to facilitate filling of the system manifold 281 and tubes TB and subsequent cleaning and drying of the same. The contents of the fill manifold 281 may be sampled through valve 296 as desired.

In order to obtain acceptable equalized dump volumes from tubes TB, the filling of the system with solvents, fluids or gases must be accomplished through the appropriate programming coordination of fill valves 275, 276 and 277 with fill manifold bypass relief valves 297, 298 and 299. Excess solvent, fluid or gas passed by valves 297, 298 and 299, passes through appropriate filters F4 and F5 and then through conduits to either drain manifold 287 or collector 291. The valve 297 can be programmed to operate selectively to dump the contents of fill manifold 281 in order to maintain repetitive fill volumes for any given tube TB and apparatus position.

Appropriate safety and interlocks, both programmed and mechanical device backups such as hood door microswitches, can be incorporated to prevent injury from leaking chemicals in an accidental situation. A manual interrupt can also be provided to allow one to hold or extend any functional extraction or treatment step. An interfaced hand-held programming module can be used to force the device valving through its key steps or to alter their duration, numbers or sequence.

In order to facilitate the removal of solids which pass through valves a–k, in-line filters, demountable or not, f1 through f10 can be put into line after the aforementioned valves and before the receiving containers in order to eliminate further gravimetric separations. In addition, VCR filters can be inserted in the tubes TB to remove material dislodged during dissolution conditions. Additional sample holders, spreaders and solution flow diffusers can be added as necessary to enhance uniformity of extractions, treatments or separations.

Figure 3:
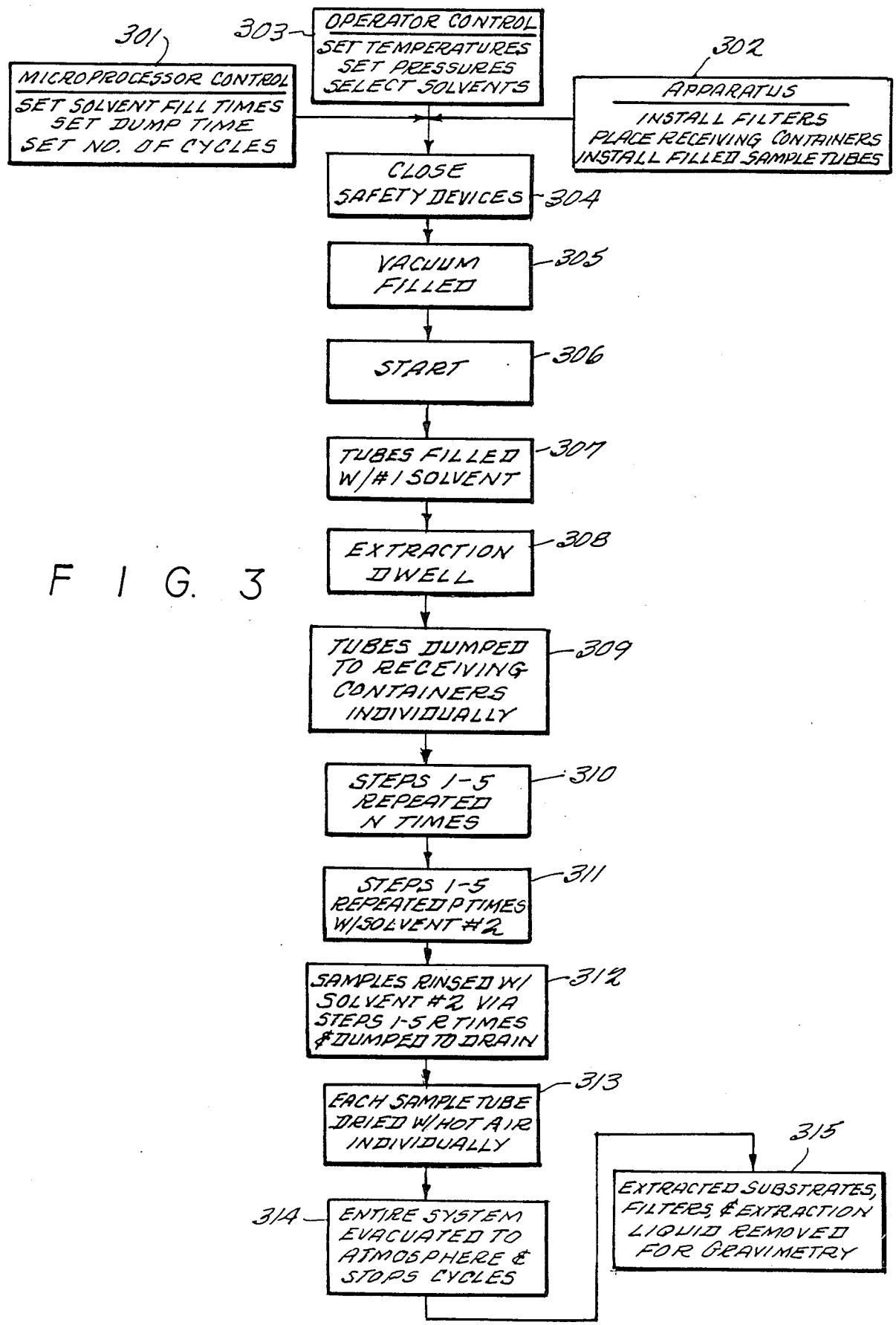
FIG. 3 shows a control scheme in flow chart form for an extraction operation.

By way of example, a control scheme for an extraction operation using the invention is shown in flow chart form in FIG. 3. As can be seen in FIG. 3, in initial steps 301, 302 and 303 the microprocessor, apparatus and operator control initiating steps are performed in order to prepare for a production run. Thereafter, safety devices are activated in step 304 and a vacuum is pulled in step 305, in preparation for a start indication in step 306. After the start indication is provided in step 306, the tubes are filled with solvent in step 307 and extraction proceeds in accordance with step 308. After completion of the extraction during the dwell interval of step 308, the tubes are dumped to receiving containers individually in step 309. Steps 305 through 309 are repeated a predetermined number of times in step 310 before control proceeds to step 311 In step 311, steps 305 through 309 are repeated a second predetermined number of times using a different solvent than what was initially used. Thereafter in step 312, the samples are rinsed with the second solvent while steps 305 through 309 are conducted a third predetermined number of times and subsequently in step 313 each sample tube is dried with hot air individually. Thereafter, in step 314, the entire system is evacuated to the atmosphere and the cycling is halted. In final step 315, the extracted substrates, filters and extraction liquids are removed for further processing.

Figure 4:
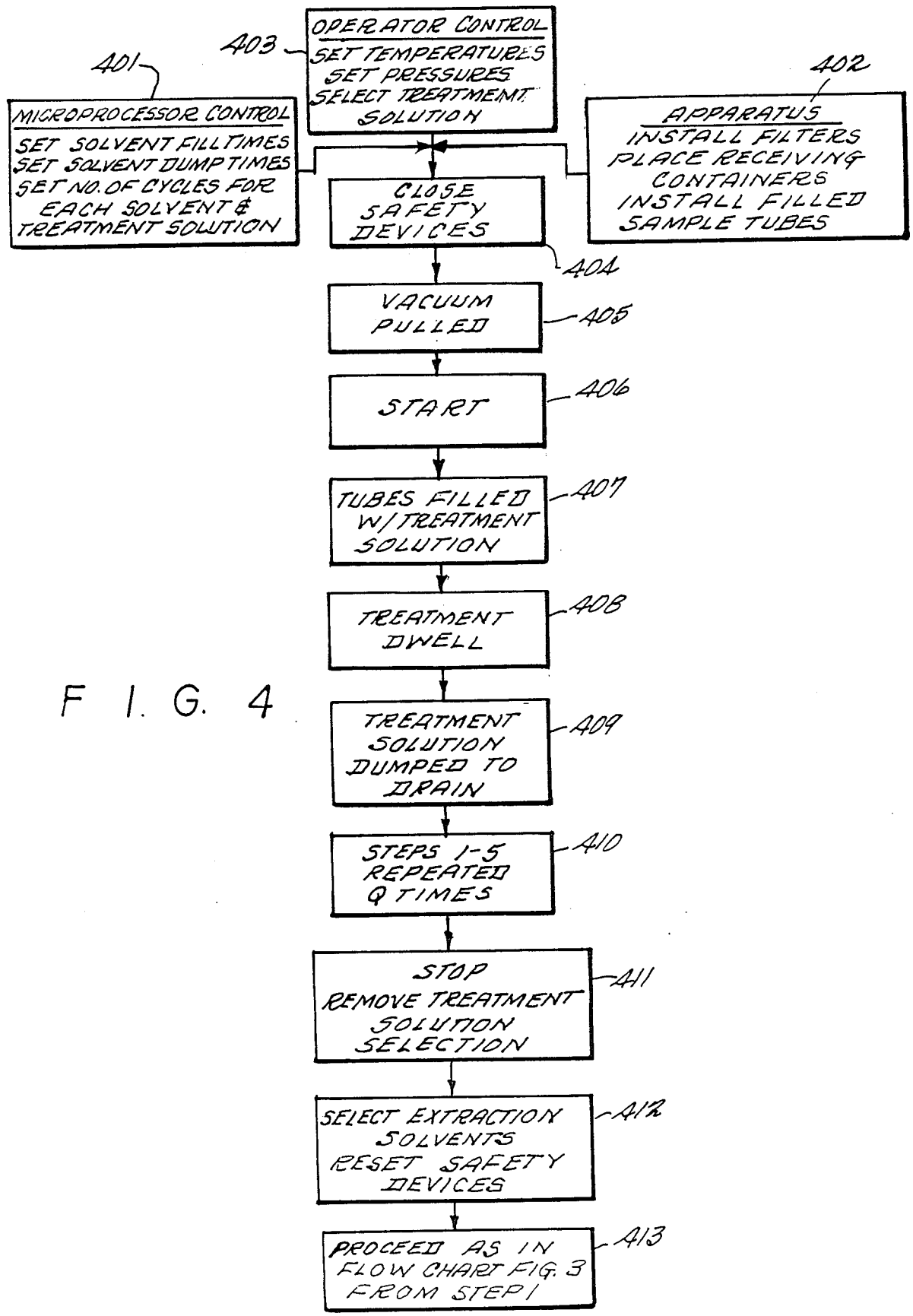
FIG. 4 shows a control scheme in flow chart form for a treatment operation.

In a second control scheme shown by the flow chart of FIG. 4, a treatment operation is conducted using the invention. First, the apparatus is prepared to run steps 401 through 407 in the same manner as in the control scheme of FIG. 3. Thereafter, in step 407, the tubes are filled with treatment solution and the treatment proceeds in accordance with the dwell time as shown in step 408. Subsequently, the treatment solution is dumped to the drain in step 409 and in step 410, steps 405 through 409 are repeated a predetermined number of times. Thereafter, in step 411, the treatment solution is removed and in step 412 extraction solvents are selected and the safety devices are reset so that in step 413 processing may now continue in accordance with the control scheme described above with respect to FIG. 3.

Although the invention has been described with respect to a specific embodiment, it should be obvious that there are numerous variations within the scope of the present invention. For example, while some control valves have been described as manually operated, it should be obvious that they too could be placed under control of the computer or process controller. Thus, the present invention is intended to cover not only the described embodiment, but also those variations falling within the scope of the appended claims.

What is claimed is:

1. An extraction and treatment apparatus, in which solvent is caused to interact with material, said apparatus comprising:
   a plurality of solvent tanks each provided for containing a solvent for use in an extraction or treatment operation;
   a plurality of sample tubes for holding solid material and for receiving solvent and within which said extraction or treatment operation being carried out for producing processed materials;
   means for interconnecting any one of said plurality of solvent tanks to said plurality of sample tubes;
   draining means connected to said plurality of sample tubes for removing processed materials;
   control means operatively connected to said interconnecting means and said draining means for operating said interconnecting means and said draining means in accordance with a predetermined sequential program of operating steps for carrying out said extraction or treatment operation from a specified period of time with a specific solvent;
   a plurality of thermal tanks each one of which is associated with at least one of said plurality of solvent tanks for receiving solvent;
   means for providing steam connected through a corresponding steam valve to each one of said plurality of thermal tanks for circulating steam within said plurality of thermal tanks in order to heat said receive solvent, said circulated steam being exhausted from each of said thermal tanks through a corresponding check valve; and
   a condensate reclamation means for collecting said circulated steam exhausted from said thermal tanks through said corresponding check valves.

2. The apparatus as in claim 1 further comprising means for pressurizing said solvent contained within each of said plurality of solvent tanks.

3. The apparatus as in claim 2 wherein said pressurizing means comprises
   a source of pressurized gas for passing pressurized ;gas along a first portion of pipe;
   a regulating valve connected between said first portion of pipe and a second portion of pipe for regulating the pressure of said pressurized gas; and
   a plurality of check valves each one of which being associated with a corresponding one of said plurality of solvent tanks and each one of which being connected to said second portion of pipe at one end and to another portion of pipe at the other end which leads to said corresponding solvent tank for introducing said regulated and pressurized gas therein.

4. The apparatus as in claim 1 further comprising means for cooling said solvent obtained from each of said plurality of solvent tanks.

5. The apparatus as in claim 4, wherein said cooling means comprises:
   a plurality of thermal tanks each one of which is associated with at least one of said plurality of solvent tanks for receiving solvent;
   a source of refrigerant connected through a corresponding refrigerant valve to each one of said plurality of thermal tanks for circulating refrigerant within said plurality of thermal tanks in order to cool said received solvent, said circulated refrigerant being exhausted from each of said thermal tanks through a corresponding check valve; and
   a refrigerant reclamation means for collecting said circulated refrigerant exhausted from said thermal tanks through said corresponding check valves.

6. The apparatus as in claim 1, wherein said draining means comprises:
   at least two drain valves connected to each one of said plurality of sample tubes, one of said at least two drain valves having an associated filter and being disposed to release said processed materials from one of said plurality of sample tubes; and
   a dump manifold connected through another one of said at least two drain valves to each one of said plurality of sample tubes.

7. The apparatus as in claim 6, wherein said interconnecting means comprises:
   a fill manifold connected to said plurality of sample tubes; and
   a plurality of fill valves each one of which is connected to said fill manifold and to at least one of said plurality of solvent tanks.

8. The apparatus as in claim 7, further comprising a vacuum generating means for drawing a vacuum on said fill manifold, said vacuum generating means being controlled by said control means.

9. The apparatus as in claim 1, each of said plurality of solvent tanks having associated depressurization and pressure relief valves, a portion of said plurality of solvent tanks having pump and filter recirculation means and another portion of said plurality of solvent tanks having associated sampling and introduction valves.

10. The apparatus as in claim 1, each one of said plurality of thermal tanks having an associated recirculation pump for recirculating said received solvent.

* * * * *